United States Patent Office 3,007,718
Patented Nov. 7, 1961

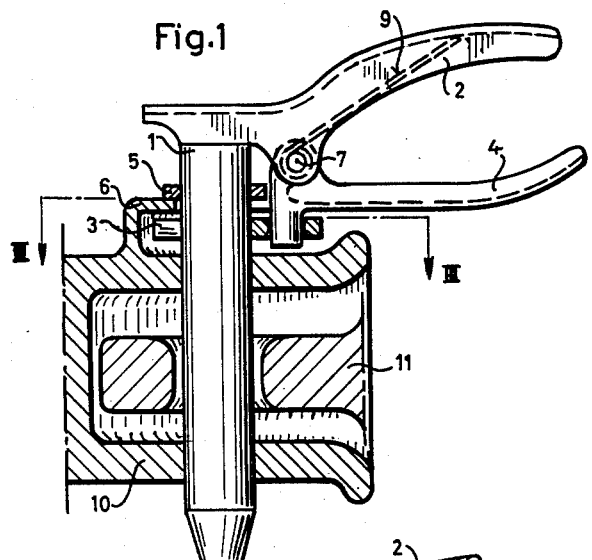
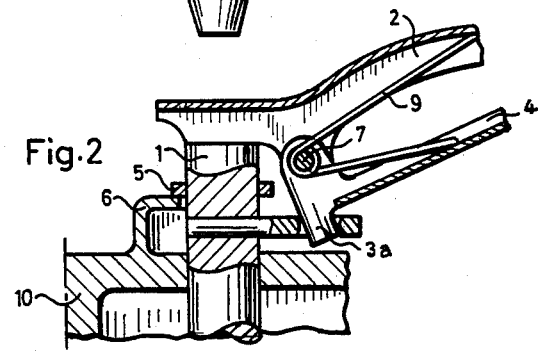
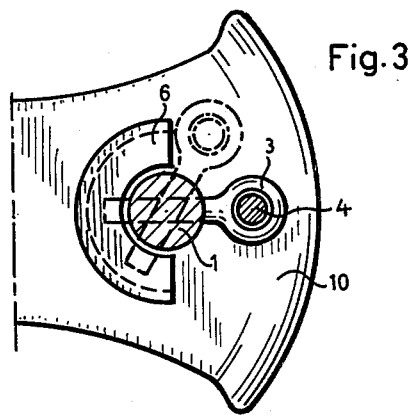

3,007,718
CONNECTING BOLT FOR TRAILER COUPLINGS
Albert Backof, Joehlingen, Baden, Germany
Filed June 17, 1959, Ser. No. 820,830
1 Claim. (Cl. 280—515)

The present invention provides a connecting bolt, capable of automatic locking which can be released by a simple turn of the hand, for use in trailer couplings, preferably for agricultural tractors.

Connecting bolts are known capable of automatic locking which can be released by a simple turn of the hand, wherein a spring-loaded thrust bar which is guided in a longitudinal bore in the bolt shank and actuates locking elements in a manner such as to cause them to swivel out of the bolt shank and which elements can be swivelled in again by means of a hand lever against the pressure of the spring so as to release the bolt which can then be withdrawn.

This type of connecting bolt can be inserted and withdrawn by a simple turn of the hand, in the case of agricultural tractors for instance from the driver's seat, and the bolt is automatically secured once it has been inserted. However, this type of bolt has the disadvantage that the longitudinal bore, in which the thrust bar is guided, weakens the bolt shank along the whole of its length, i.e. also where the tensile stresses act on it, whereby accidents can be caused.

The object of the present invention is a connecting bolt in which all the advantages of the automatically secured trailer coupling bolt are retained and which enables the trailer to be coupled and uncoupled by a simple turn of the hand, without the afore-mentioned weakening of the stressed portion of the connecting bolt.

This aim is achieved by way of a connecting bolt comprising a conventional shank and a handle and provided with a securing pin inserted in a cross bore located above the bolt shank portion subjected to tensile stresses. At that end of the securing pin which protrudes from the bolt shank there is linked on a handle-type lever which can be turned against the pressure of a hinge spring about a pivot pin inserted in the bolt handle; the other end of the securing pin is pressed by the hinge spring upwards against a substantially semicircular cap which is welded on to the coupling flange. The securing pin is of a length such that when the lever is operated by hand, the pin is completely drawn into the bore in the bolt shank against the pressure of the hinge spring.

By means of a different solution of the design problem the new connecting bolt combines the advantages of the known self-locking bolts with the advantage that no stressed portion of the bolt shank is weakened.

Further details of the object of the invention are described below with reference to the accompanying drawing, in which FIG. 1 shows in part-sectioned elevation parts of the trailer coupling with the new connecting bolt inserted and secured, FIG. 2 is a like view of the new connecting bolt, in the unlocked position, and FIG. 3 is a section on III—III in FIG. 1.

A handle 2 is welded on to the top end of the bolt shank 1 which has above the portion on which the trailer coupling exerts tensile stresses a cross bore in which a securing pin 3 is guided. One end of the securing pin is linked on to the end 3a of the handle-type lever 4 which is substantially parallel to the handle 2; the other end of the securing pin 3 extends underneath a semicircular cap 6 which is welded on to the substantially flat upper surface of the first coupling member 10 in which is received the second coupling members 11, said first and second coupling members having aligned apertures therethrough, and the pin can thus be freely turned until it is stopped by the cap (see FIG. 3). By way of a pivot 7 the lever 4 is attached to the handle 2 and can be turned about it against the pressure of the hinge spring 9, whereby the free (lefthand) end of the securing pin is completely drawn into the bolt shank. In this manner the connecting bolt is unlocked and released for coupling or uncoupling respectively. The collar 5, which surrounds the bolt shank to which it is welded on, serves as a support for the shank 1 on the cap 6 and thus takes the load off the securing pin 3 which otherwise would have to be supported by the coupling flange 10.

The safety in operation of the new connecting bolt is ensured by the fact that even were the hinge spring 9 to fracture, the load of the hand lever 4 would continue to act on the securing pin 3 so that the bolt 1 could not work itself loose.

What I claim is:

A coupling, comprising a first coupling member provided with a substantially flat upper surface, a semicircular cap member secured to said upper surface and having a portion in spaced relation thereto, a second coupling member received in said first coupling member, said first and second coupling members having aligned apertures therethrough, a bolt shank adapted to be received in said aligned apertures, a collar secured to said bolt and adapted to rest on said cap member, a securing pin passing transversely through said bolt shank in slidable relation thereto, said securing pin adapted to pass beneath said cap member, a handle fixed to the upper end of the bolt shank, a lever pivoted to said handle and operatively connected to said securing pin, and spring means coacting between said handle and lever to thereby urge the securing pin beneath the cap member.

References Cited in the file of this patent

UNITED STATES PATENTS

| 1,972,423 | Larson | Sept. 4, 1934 |
| 2,522,215 | De Shane | Sept. 12, 1950 |
| 2,668,723 | Krefting | Feb. 9, 1954 |

FOREIGN PATENTS

| 13,449 | Germany | Jan. 5, 1956 |
| 250,663 | Great Britain | Apr. 15, 1926 |